Oct. 17, 1950     K. A. SKARDAL     2,526,428
MECHANICAL RELAY
Filed Jan. 10, 1949
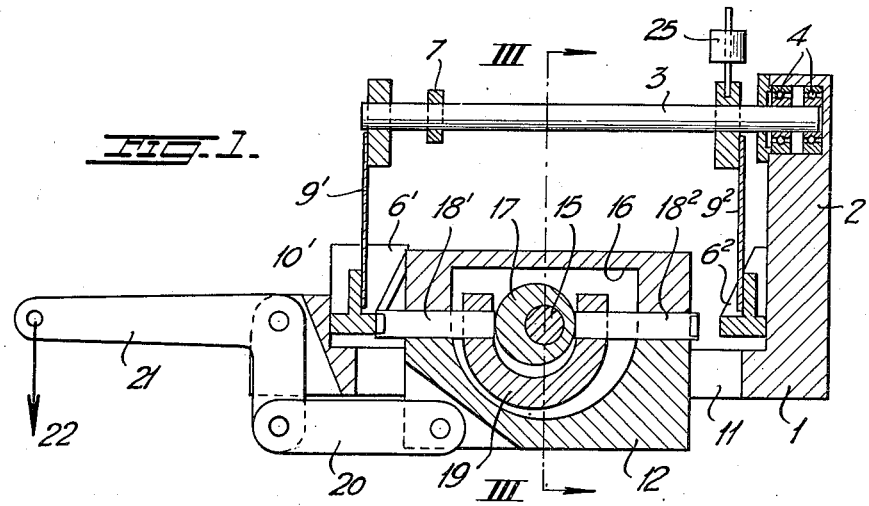
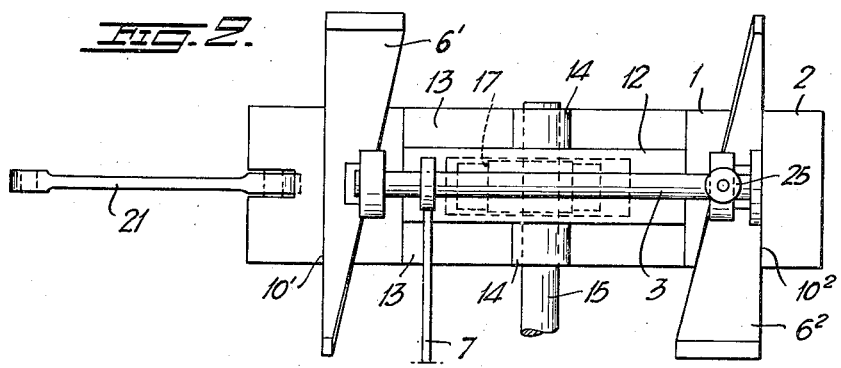
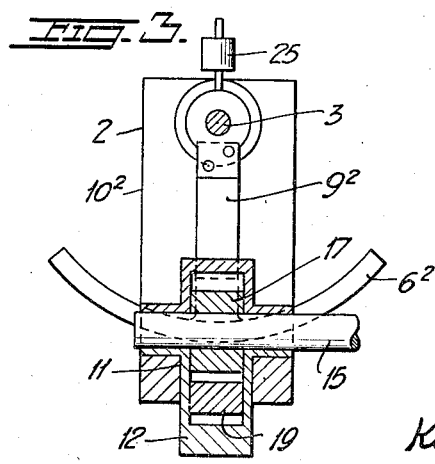
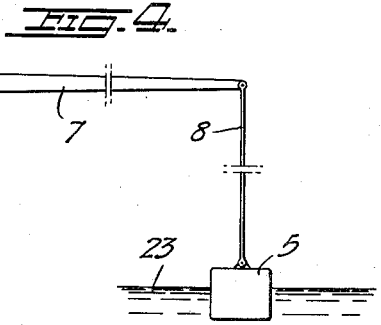
Inventor
Karl Arvid Skardal
by Sommers & Young
Attorneys Patented Oct. 17, 1950

2,526,428

UNITED STATES PATENT OFFICE 2,526,428

MECHANICAL RELAY

Karl Arvid Skardal, Stockholm, Sweden

Application January 10, 1949, Serial No. 70,090
In Sweden January 9, 1948

6 Claims. (Cl. 74—25)

(Granted under the provisions of sec. 14, act of
March 2, 1927; 357 O. G. 5)

The present invention relates to a mechanical relay for transferring a movement of a primary element-impulse element—effected by an arbitrarily small power to a corresponding movement of a secondary element-control element—effected by an arbitrarily great power.

The relay according to the invention comprises, in part, a pair of curved wedge members mounted to swing in unison about a common horizontal axis and forming between themselves a space axially bounded by parallel helical side surfaces of said wedge members, and, in part, a carrier movable in a direction parallel with the axis of said wedge members for connection with the control element and, finally, a slidably mounted member in said carrier which is positively reciprocable in the direction of movement of the carrier within a path fixed with relation to said carrier, said slidable member being in engagement with the space between the wedge members in such a way as to be capable of moving in a direction parallel with the horizontal axis of the wedge members in the space between the helical side surfaces thereof, the axial width of said space corresponding to the length of the path of the slidable member, so that a rotation of the wedge members will cause a displacement of the centre of the path of the slidable member, and thus, a corresponding displacement of the carrier and a shifting of the control element connected therewith.

In a preferred embodiment of the relay according to the invention the wedge members comprise arc-shaped pendulum weights suspended by means of flexible strips from an easily moving shaft adapted to be rotated under the influence of the impulse element. The side surfaces of said pendulum weights remote from each other are plane and extend at right angles to said shaft in close proximity to stationary frame members.

The relay according to the invention may be used for various purposes. In the accompanying drawing an embodiment of the relay is illustrated as a level regulator.

In the drawing:

Fig. 1 is a vertical section of the relay on a line parallel with the axis of the wedge members;

Fig. 2 is a horizontal view of the relay and,

Fig. 3 is a vertical section at right angles to the axis of the wedge members on the line III—III of Fig. 1.

Fig. 4 is a side elevation of the impulse element of the level regulator.

It is to be noted, however, that the structure of the impulse element is not restricted to that indicated in the drawing but may be varied according to the nature of the impulse producing power in every individual case.

Mounted in a stationary frame, which in the drawing comprises a horizontal base member 1 and a vertical standard 2, in a way to rotate easily therein, as by means of ball bearings 4, is a horizontal shaft 3. Said shaft 3 supports, in part, an impulse element which in the example shown consists of a float 5, Fig. 4, and, in part, a pair of arc-shaped wedge members $6^1$, $6^2$. The float 5 is supported by means of an arm 7 secured to said shaft and a link 8 depending therefrom, and the wedge members are supported by flexible steel strips $9^1$ and $9^2$, respectively. Said wedge members $6^1$ and $6^2$ are circularly bent with respect to shaft 3 and are situated at equal radial distances therefrom. The side surfaces of the wedge members facing each other represent parallel helical surfaces, the space between which is of the same axial width all over.

The remote side surfaces of the wedges are plane and perpendicular to the longitudinal direction of shaft 3. Said plane vertical surfaces are situated in immediate proximity to correspondingly vertical surfaces $10^1$ and $10^2$, respectively, of the stationary frame 1, 2, which are perpendicular to the shaft. The shaft 3 with the wedges 6 and the supporting strips 9 represent in the example shown in the drawing a pendulum system with the wedges 6 as weights. This system is balanced by a weight 25, so that it may be operated by a minimum impulse and may occupy an indifferent position of equilibrium.

Slidably mounted in a groove 11 formed in the base member 1 of the stationary frame is a block 12 resting by later flanges 13 on the top surface of the base member, Fig. 3. Mounted in bearings 14 on said lateral flanges is a shaft 15 which extends at right angles to the longitudinal direction of said groove 11, that is to say, at right angles to the axis of shaft 3. Within an aperture 16 in the block 12 the shaft 15 supports an eccentric 17. Bearing against diametrically opposite points of said eccentric are two sliding members 18 slidably mounted in borings formed in block 12 which extend at right angles to shaft 15. Though in the drawing said sliding members are shaped as cylindrical plungers $18^1$, $18^2$ guided in cylindrical borings, it is to be noted that, of course, the structure may vary within the scope of the invention. Said plungers are rigidly connected to each other through an arc-shaped member 19 which extends freely around half the circumference of the eccentric. Thus, the plungers $18^1$, $18^2$ and the connecting member 19 form together a rigid system to which on the rotation of shaft 15 is imparted a reciprocatory movement parallel with shaft 3 by the action of the eccentric. The path of movement of said system, that is to say, the distance from the extreme outer position of one plunger to the extreme outer position of the other plunger at stillstanding block 12, is equal to the distance in a direction parallel to shaft 3 between the oblique side surfaces of the wedges 6, that is to say, equal to the width in the direction of shaft 3 of the helical space between the wedge members.

The sliding block 12 is connected by a link 20, a bell crank lever 21 pivoted to the rigid frame 1 and other elements, not shown, which are represented in Fig. 1 by the arrow 22, to the control element which in the example under consideration may comprise a valve mechanism for adjusting the level—23 in Fig. 4—to be controlled.

The operation of the mechanism described—as for maintaining the level 23 constant—is as follows:

As long as the level does not change, the float remains at a corresponding level and maintains the shaft 3 and the pendulum system 6, 9 against movement. Thus, during the rotation of shaft 15 the eccentric 17 displaces the sliding system 18, 19 between points of the wedges 6. As a result no movement is imparted from the block 12 and the connecting system 20—22 to the control system. If, however, a change of the level 23 occurs, then the float is raised or lowered, as the case may be, thereby causing a corresponding rotation of shaft 3. The pendulum system now makes a deflexion in the one direction or the other, whereby a wider portion of one wedge and a correspondingly narrower portion of the other wedge are brought into register with the plungers 18. In other words, the wedges shift the dead centres of the plungers to the one side or the other with relation to the rigid frame. This causes a corresponding displacement of the eccentric together with shaft 15 and, since said shaft is mounted in the block 12, the latter is caused to partake of the movement. By means of the link system 20—22 the movement of the block is imparted to the control element, as for instance, the valve, causing it to vary the supply of liquid to or the withdrawal of liquid from the bulk of liquid in a degree that corresponds to the change of the level. How to exert this control in detail falls beyond the scope of this invention and needs not be described.

Power for rotating the shaft 15 may be supplied in any way desired. It is preferred to mount an electric motor on a support rigidly connected to block 12 so as to move therewith. Also in other respects changes of details may be made within the scope of the invention, as defined by the following claims.

What I claim is:

1. A mechanical relay for transferring a movement of a primary impulse element as effected by an aribitrarily small power to a corresponding movement of a secondary control element, as effected by an arbitrarily great power, comprising in combination, a rigid frame, a pair of oppositely positioned cylindrically curved wedge members mounted to swing in unison in said frame about a common horizontal axis, representing the axis of curvature of said wedge members, under the influence of said impulse element, the oppositely positioned side surfaces of said wedge members representing parallel helical surfaces, a slide unit reciprocable in the axial space between said surfaces of the wedge members in a path parallel with the axis of the wedge members, the length of said path in said direction being equal to the axial width of said space, means for positively reciprocating said slide unit in said path, a carrier for said slide unit having a guideway therefor parallel with the axis of the wedge members, said carrier being slidably mounted in a guideway of the rigid frame substantially parallel with the axis of the wedge members, and means for connecting said carrier with said control element, the arrangement being such that a rotation of the drum will cause a displacement of the path for the slide unit in the longitudinal direction thereof and a corresponding displacement of the carrier and shifting of the control element connected therewith.

2. A mechanical relay as claimed in claim 1, and the end surfaces of the side surfaces of the wedge members remote from each other are plane and extend at right angles to the axis of the wedge members, said plane surfaces being positioned immediately adjacent to corresponding surfaces of the rigid frame.

3. A mechanical relay according to claim 2, and in which the curved wedge members comprise pendulum weights carried by flexible members connected to a horizontal shaft rotatably mounted in the rigid frame, said flexible members being arranged to allow a resilient movement of the weights in a direction parallel to said shaft, the pendulum weights being formed as curved members concentric with their supporting shaft.

4. A mechanical relay as claimed in claim 1, and in which the means for positively reciprocating the slide unit comprises a driving shaft rotatably mounted in the carrier and extending at right angles to the direction of the movement of the carrier and an eccentric mounted on said shaft for operating the slide unit.

5. A mechanical relay as claimed in claim 1, and in which the means for positively reciprocating the slide unit comprises a driving shaft rotatably mounted in the carrier extending at right angles to the direction of the movement of the carrier and an eccentric mounted on said shaft for operating the slide unit, the slide unit comprising two plungers arranged in alinement with each other on opposite sides of the driving shaft mounted in the carrier, said carrier having corresponding borings to receive said plungers, the adjacent ends of the plungers being rigidly connected by means of a curved member enclosing the eccentric without touching same.

6. A mechanical relay as claimed in claim 1, and in which the means for positively reciprocating the slide unit comprises a driving shaft rotatably mounted in the carrier extending at right angles to the direction of the movement of the carrier and an eccentric mounted on said shaft for operating the slide unit, the slide unit comprising two plungers arranged in alignment with each other on opposite sides of the driving shaft mounted in the carrier, said carrier having corresponding borings to receive said plungers, the adjacent ends of the plungers being rigidly connected by means of a curved member enclosing the eccentric without touching same, the carrier being mounted in a guideway in the rigid frame which extends parallel with the axis of the wedge members and being connected to the control element through a lever pivoted to the rigid frame and a link provided between said lever and the carrier.

KARL ARVID SKARDAL.

No references cited.